…

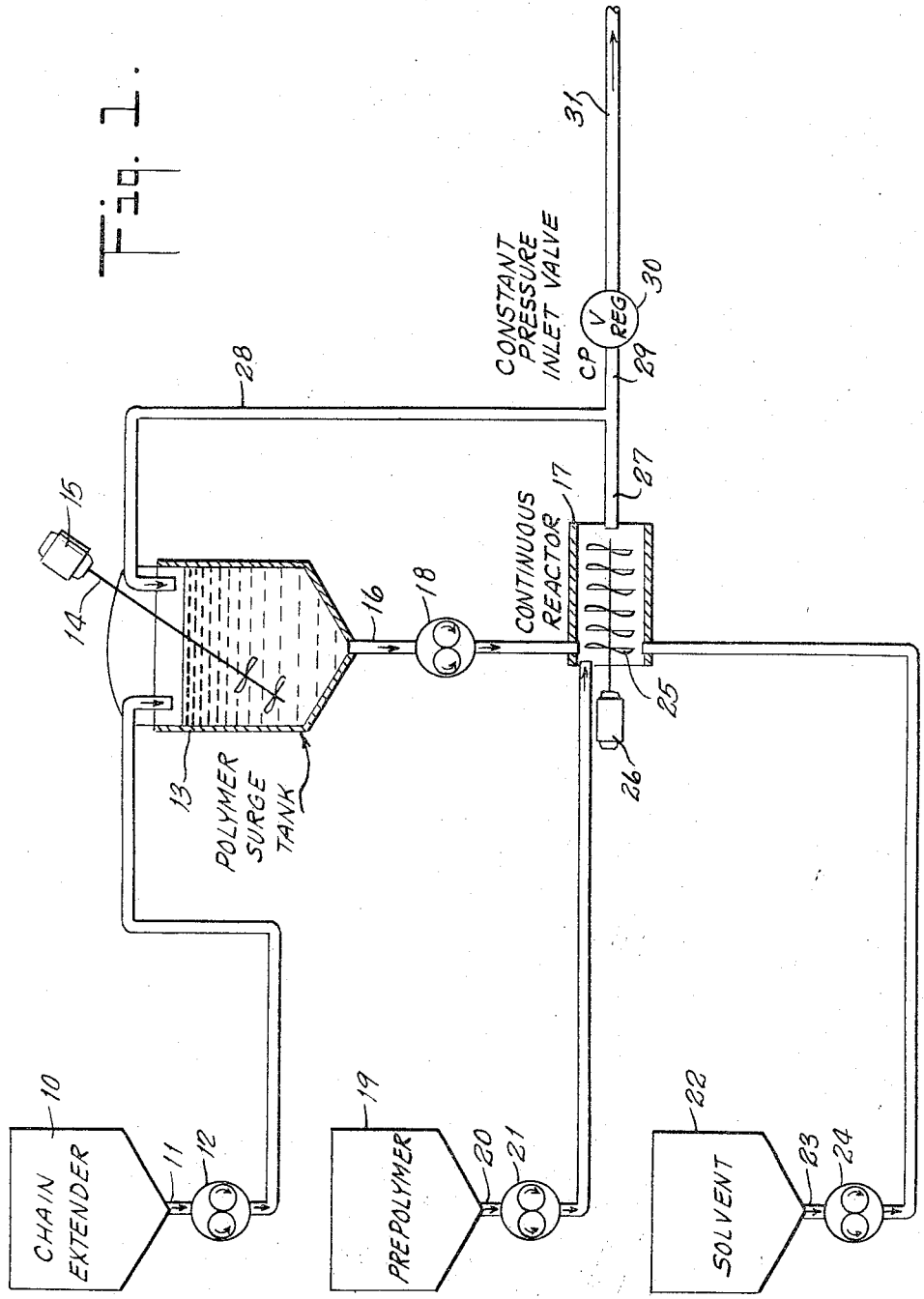

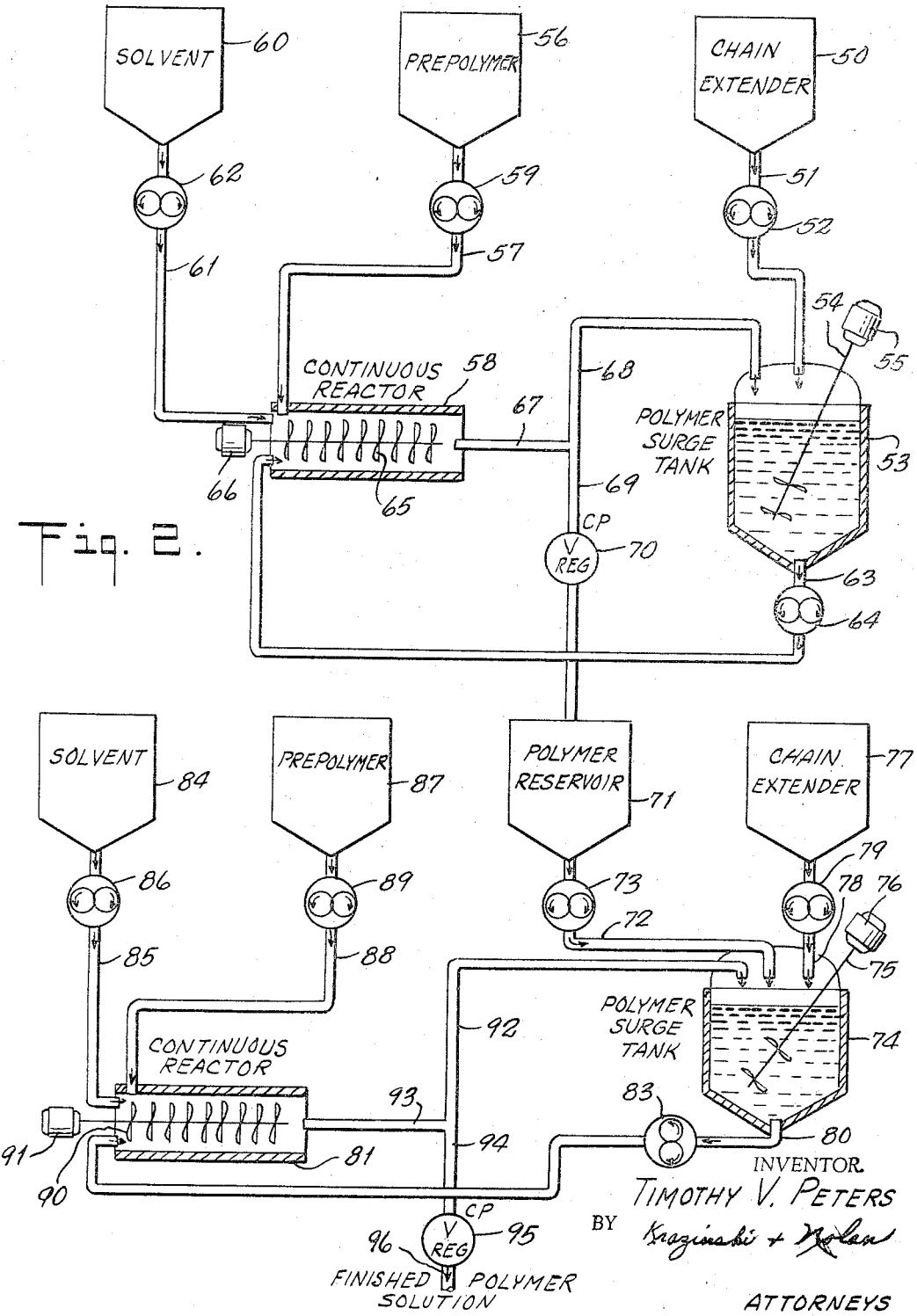

United States Patent Office 3,346,529
Patented Oct. 10, 1967

3,346,529
CONTINUOUS PROCESS OF PRODUCING SOLUTIONS OF SUBSTANTIALLY LINEAR POLYURETHANES
Timothy Victor Peters, Tewkesbury Township, N.J., assignor to Ameliotex, Inc., New York, N.Y., a corporation of New York
Filed Jan. 4, 1965, Ser. No. 423,285
7 Claims. (Cl. 260—32.6)

ABSTRACT OF THE DISCLOSURE

A continuous process for producing a polyurethane solution by continuously passing a stream of isocyanate terminated prepolymer, a stream of chain extender containing two active hydrogen atoms, a stream of a polyurethane solution having a solids content of 10 to 30% and a stream of solvent for said polyurethane into a mixing zone. The amount of the polyurethane solution introduced into the mixing zone is 50 to 90% of the total volume introduced into said mixing zone.

---

This invention relates to substantially linear polyurethanes and more particularly to a continuous process of producing solutions of substantially linear polyurethanes.

Solutions of substantially linear polyurethanes are employed for the production of fibers, films and other shaped articles. For this purpose, such solutions should be homogeneous and substantially free from any gel formation. The rate of reaction in the production of polyurethanes is extremely fast and the production of a homogeneous solution poses a real challenge to produce a uniform reaction product which is adapted for the production of fibers. As a result of the gel formation, the usual process of producing homogeneous solution has been of the batch type. But the batch process entails difficulties in controlling solution viscosity and solids content.

In accordance with this invention, solutions of polyurethanes are produced by a continuous process in which gel formation is substantially precluded and in which solutions viscosity and solids content are effectively controlled. In the process of this invention, a substantially linear isocyanate terminated prepolymer, a stream of a chain extender containing substantially two active hydrogen atoms capable of reacting with terminating isocyanate groups of such prepolymer, a stream of a solution of substantially linear polyurethanes and a stream of a solvent for the polyurethanes are continuously passed into a mixing zone. The amount of the solution of the linear polyurethanes introduced into the mixing zone is 50 to 95% and desirably 70 to 85% of the total volume introduced into the mixing zone. The solution of the substantially linear polyurethanes introduced into the mixing zone has a solids content of 10 to 30%, and desirably 15 to 25%. The prepolymer employed is the reaction product of a diisocyanate and a polyether glycol, polyester glycol, a mixture of a polyether glycol and a polyester glycol or a plurality of any of these glycols or mixtures thereof. Preferably, the solution of the substantially linear polyurethanes is obtained by the recycling of a portion of the effluent from the mixing zone. The introduction of the solution of the substantially linear polyurethanes into the mixing zone permits the reaction to occur at substantially any desired dilution to produce an effective nongelling, homogeneous solution of substantially linear polyurethanes. In the practice of the process 50 to 90% by volume and preferably 70 to 85% by volume, of the effluent from the mixing zone is recycled to the entrance of the mixing zone to constitute the stream of a solution of substantially linear polyurethanes which is introduced into the mixing zone.

Examples of the linear condensation polyurethanes produced by the practice of this invention are those described in the copending U.S. patent application of Timothy V. Peters, S.N. 340,548, filed Jan. 27, 1964. For such production, the reactants described in patent application, S.N. 340,548 may be utilized to produce the solution of such polyurethanes by the process of this invention. In addition, solutions of linear polyurethanes described in U.S. Patent No. 2,755,266 granted to the assignee of Brenshede on July 17, 1956, and U.S. Patent No. 2,929,800 granted to the assignee of Hill on Mar. 22, 1960, may be produced by the process of this invention. For this purpose, the components employed in the batch methods described in these patents are used to produce such linear polyurethanes.

A more comprehensive understanding of this invention is obtained by reference to the following drawings in which:

FIG. 1 shows apparatus for the production of solutions in linear polyurethanes in which one chain extender is employed; and FIG. 2 shows apparatus for the practice of the method of this invention in which two chain extenders are used.

In FIG. 1, a reservoir 10 contains a chain extender, or plurality of chain extenders such as ethylene diamine, desirably dissolved in a solvent, such as dimethyl formamide. The solution of the chain extender passes to a polymer mixing tank 13 through a conduit 11. a precision metering device, such as a gear pump 12, in a conduit 11 controls the rate of flow of the chain extender passing through the conduit 11 into the mixing tank 13. The chain extender is mixed in the tank 13 with a solution of substantially linear polyurethanes. An agitator 14 driven by a motor 15 agitates the mixture contained in the tank 13 and facilitates the production of a uniform mixture. The mixed polymer and chain extender passes from the tank 13 through a conduit 16 to a mixing zone or continuous reactor 17. A precision metering device, such as a gear pump 18, is interposed in the conduit 16 to provide the desired flow rate of the mixture into the continuous reactor 17. A reservoir 19 is provided for containing an isocyanate terminated prepolymer comprising a reaction product of a diisocyanate or plurality of diisocyanates with a polyether glycol, polyester glycol or mixtures of polyether glycols and polyester glycols. An example of such isocyanate terminated prepolymers is the reaction product of methylenebis(4-phenyl-isocyanate) and 2000 molecular weight poly(neopentyladipate) glycol reacted in the molecular ratio of 2 moles of the isocyanate to 1 mole of the glycol. The stream of the prepolymer passes through a conduit 20 having a precision metering device, such as a gear pump 21. The conduit 20 passes to the mixing zone or continuous reactor 17. A reservoir 22 contains a solvent for the polyurethane, such as dimethylformamide, dimethylacetamide or dimethylsulfoxide. The solvent passes from the reservoir 22 through a conduit 23 having a precision metering device, such as a gear pump 24. The conduit 23 passes to the mixing zone or continuous reactor 17. A high shear agitating device 25 driven by a motor 26 thoroughly mixes the polymer, chain extender and solvent supplied through the conduit 16, the prepolymer through the conduit 20 and the solvent through the conduit 23. The solution of the substantially linear polyurethane which is produced is passed through conduit 27. Part of the solution is recycled from conduit 27 through a conduit 28 to the polymer reservoir 13. The remaining portion of the solution of the substantially linear polyurethane produced is passed through a conduit 29 through a constant pressure-inlet valve 30 to be withdrawn through a conduit 31. The amount or proportion by volume of the solution of the substantially linear polyurethane which is recycled and withdrawn is controlled by the metering device 18. The pressure in the system is controlled by the constant pressure-inlet valve 30.

If a 75% recycle rate is desired, for example, the gear pump 18 operates at the pumping rate of gear pump 12 plus three times the combined pumping rates of gear pumps 12, 21 and 24. While conduit 11 is shown entering the polymer mixing tank 13, it could enter the solvent conduit 23 between the pump 24 and the reactor 17 or could be introduced into the mixing zone or continuous reactor 17. The rates of flow in conduits 20 and 23 are adjusted to obtain the desired percent solids in the polyurethane solution. For example, if a 20 percent by volume polymer solution is desired, gear pump 24 operates at a rate sufficient to supply four times the volume of prepolymer plus chain extender. While conduit 23 is shown entering directly into the continuous reactor 17, it could (A) enter through conduit 20 between the gear pump 21 and the reactor 17, (B) separate into two lines entering conduit 11 between the gear pump 12 and the tank 13 and conduit 20 between the gear pump 21 and reactor 17 or (C) enter the polymer surge tank 13. In the event it is desired to operate on the isocyanate side of stoichiometry, conduit 11 enters either the continuous reactor 17 between the gear pump 21 and reactor 17 or conduit 23 between the gear pump 24 and reactor 17. Under these circumstances, it should not enter the polymer mixing tank 13 as shown in FIG. 1.

Non-reactive additives, such as stabilizers and pigments may be continuously metered into either the polymer mixing tank or the continuous reactor. Viscosity is desirably continuously determined and adjustments made in conduits 11 or 20 by means of their respectively associated gear pumps to maintain the desired level.

In FIG. 2, a two step chain extension is shown. The two step chain extension for the production of polyurethane solutions is shown and described in the co-pending application of T. V. Peters, S.N. 340,548. The system illustrated in FIG. 2 is similar to that described with respect to FIG. 1. In the system shown in FIG. 2, three tanks are provided for containing the chain extender, the prepolymer and the solvent. The reservoir or tank 50 contains the first chain extender or plurality of first chain extenders. A conduit 51 passes the first chain extender through a metering device, such as a gear pump 52, to a polymer surge tank 53. The reservoir or tank 53 contains means for uniformly agitating the mixture in it. Conveniently, that mixing means comprises an agitator 54 driven by a motor 55. A second reservoir 56 contains the prepolymer which may be the same or different from that contained in the tank 19 of FIG. 1. A conduit 57 passes from the reservoir 56 to a reactor or mixing zone 58. A metering device 59 is interposed in the conduit 57 to control the flow of prepolymer to the mixing zone 58. The third reservoir 60 contains a solvent for the substantially linear polyurethane which is produced in the mixing zone 58. This solvent passes through a conduit 61 to the mixing zone 58. Interposed in the conduit 61 is a metering device, such as a gear pump 62, which controls the flow of the solvent to the mixing zone 58. The mixture comprising the chain extender and a recycled polyurethane solution from the reservoir 53 passes to the continuous reactor or mixing zone 58 through a conduit 63 having interposed in it a metering device, such as a gear pump 64. The mixing area 58 has a high shear agitating device 65 for insuring that the solvent, recycled polymer, prepolymer and chain extender are rapidly and uniformly mixed. The agitator 65 is rotated by a motor 66. The solution of the substantially linear polyurethanes which is produced in the mixing zone 58 is passed through a conduit 67. Part of the solution is recycled from conduit 67 through a conduit 68 to the reservoir 53. The remaining portion of the solution of the substantially linear polyurethane produced is passed through a conduit 69 through a constant pressure inlet valve 70 to a reservoir 71. The amount or proportion by volume of the solution of the substantially linear polyurethane which is recycled and withdrawn is controlled by the metering device 64. The pressure in this system is controlled by the constant pressure inlet valve 70. The intermediate polymer in the reservoir 71 passes through a conduit 72 having a metering device 73 therein to a polymer surge tank 74. The polymer surge tank 74 contains an agitator 75 rotated by a motor 76 to insure a uniform mixture of the materials contained therein. The reservoir 77 contains the second chain extender or a plurality of second chain extenders. The second chain extender passes through a conduit 78 to the polymer surge tank 74. A metering device 79 in the conduit 78 controls the rate of flow of the second chain extender to the polymer surge tank 74. The mixture of the second chain extender, the product of the first step from the tank 71 and a recycled polyurethane solution from a second step reactor 81 are passed through a conduit 80 to the continuous reactor 81. The rate of flow of the mixture to the continuous reactor 81 is controlled by a metering device 83, such as a gear pump. A reservoir 84 contains the solvent for the linear polyurethane produced. This solvent passes through a conduit 85 to the mixing zone or continuous reactor 81. Interposed in the conduit 85 is a metering device, such as the gear pump 86. The rate of flow of the solvent to the mixing area or continuous reactor is controlled by the gear pump 86. A reservoir 87 contains the prepolymer for the second step. The prepolymer passes to the continuous reactor 81 through a conduit 88 having interposed therein a metering device, such as a gear pump 89. A high shear agitating device 90 rotated by a motor 91 thoroughly mixes the reactants and solvent in the continuous reactor 81. The solution of the substantially linear polyurethane which is produced is passed through a conduit 93. Part of the solution is recycled from conduit 93 through a conduit 92 to the surge tank 74. The remaining portion of the solution of the substantially linear polyurethanes produced is passed through a conduit 94 through a constant pressure inlet valve 95 to be withdrawn through a conduit 96. The amount or proportion by volume of the solution of the substantially linear polyurethane which is recycled is controlled by the metering device 83. The pressure in the system is controlled by the constant pressure inlet valve 95.

In the same manner that the amount of recycling is controlled in the apparatus shown in FIG. 1, the gear pump 83 is employed to control the recycling rate of the apparatus shown in FIG. 2. For example, if a 75% recycle rate is desired, the gear pump 83 operates at the combined pumping rates of gear pumps 79 and 73 plus three times the combined pumping rates of gear pumps 86, 89, 79 and 73. Instead of the conduit 72 entering the tank 74, it may enter the reactor 81 or conduit 85 between the gear pump 86 and reactor 81. Likewise, the conduit 78 instead of entering the surge tank 74 may pass into the reactor 81 directly or alternatively into the conduit 85 between the metering device 86 and the reactor 81. The conduit 85 the metering device 86 and the reactor conduit 81 may enter the conduits 88, 72 or 78 at a point between the respecitvely associated metering devices of each conduit and the outlet of such conduit. The rates of flow in conduits 61, 85, 57 and 88 are controlled by their respectively associated metering devices 62, 86, 59 and 89 to obtain the desired percent solids in the polyurethane solution.

If desired, the solvent utilized in the first and second steps of the system shown in FIG. 2 may be supplied from a common tank. Likewise, the prepolymer which is supplied in the system shown in FIG. 2 from tanks 56 and 87 may also be supplied from a common source.

Obviously, piping and pumping arrangements other than those described above and illustrated in FIGS. 1 and 2 are possible within the scope of this invention. It is important, however, that mutually reactive components be mixed only in the high-shear continuous reactors 17, 58 and 81 where the polymer solution can serve as a diluent.

What is claimed is:

1. A continuous process of producing a solution of substantially linear polyurethanes comprising passing continuously into a mixing zone a stream of a substantially linear isocyanate terminating prepolymer, a stream of a chain extender containing substantially two active hydrogen atoms capable of reacting with terminating isocyanate groups of said prepolymer, a stream of a solution of substantially linear polyurethanes having a solids content of 10 to 30% and a stream of a solvent for said polyurethanes, the amount of said solution of said linear polyurethanes introduced into said mixing zone being 50 to 95% of the total volume introduced into said mixing zone, said prepolymer being the reaction product of a diisocyanate and a member selected from the class consisting of polyether glycols, polyester glycols and mixtures of said polyether glycols and polyester glycols.

2. A continuous process of producing a solution of substantially linear polyurethanes comprising passing continuously into a mixing zone a stream of a substantially linear isocyanate terminated prepolymer, a stream of a chain extender containing substantially two active hydrogen atoms capable of reacting with terminating isocyanate groups of said prepolymer, a stream of a solution of substantially linear polyurethanes having a solids content of 15 to 25% and a stream of a solvent for said polyurethanes, the amount of said solution of said linear polyurethanes introduced into said mixing zone being 70 to 85% of the total volume introduced into said mixing zone, said prepolymer being the reaction product of a diisocyanate and a member selected from the class consisting of polyether glycols, polyester glycols and mixtures of said polyether glycols and polyester glycols.

3. A continuous process of producing a solution of substantially linear polyurethanes in accordance with claim 1, in which the solution of substantially linear polyurethanes is obtained by the recycling of a portion of the effluent from the mixing zone.

4. A continuous process of producing a solution of substantially linear polyurethanes in accordance with claim 2, in which the solution of substantially linear polyurethanes is obtained by the recycling of a portion of the effluent from the mixing zone.

5. A continuous process of producing a solution of substantially linear polyurethanes in accordance with claim 1, in which 50 to 95% by volume of the effluent from the mixing zone is recycled to the entrance of the mixing zone to constitute said stream of a solution of substantially linear polyurethanes.

6. A continuous process of producing a solution of substantially linear polyurethanes in accordance with claim 2, in which 70 to 85% by volume of the effluent from the mixing zone is recycled to the entrance of the mixing zone to constitute said stream of a solution of substantially linear polyurethanes.

7. A continuous process of producing a solution of substantially linear polyurethanes in accordance with claim 2, in which the chain extender is ethylene diamine, the solvent is dimethyl formamide and the substantially linear isocyanate terminated prepolymer is the reaction product of poly(neopentyladipate) glycol having a molecular weight of about 2000 and a 100% mole excess of methylene-bis-(4-phenylisocyanate).

References Cited
UNITED STATES PATENTS

| | | | |
|---|---|---|---|
| 2,141,865 | 7/1964 | McEvoy | 260—77.5 |
| 3,180,854 | 4/1965 | Schneider et al. | 260—77.5 |
| 3,271,346 | 9/1966 | Wakasa et al. | 260—34.2 |

JULIUS FROME, *Primary Examiner.*

ALLAN LIEBERMAN, *Examiner.*

UNITED STATES PATENT OFFICE

CERTIFICATE OF CORRECTION

Patent No. 3,346,529            October 10, 1967

Timothy Victor Peters

It is hereby certified that error appears in the above numbered patent requiring correction and that the said Letters Patent should read as corrected below.

Column 2, line 28, for "a", in italics, read -- A --; line 34, strike out "stantially linear polyurethanes. An agitator 14 driven by" and insert the same after "sub-" in line 32, same column 2; column 4, line 59, after "85" insert -- between --; column 6, line 32, for "2,141,865" read -- 3,141,865 --.

Signed and sealed this 26th day of November 1968.

(SEAL)
Attest:

Edward M. Fletcher, Jr.            EDWARD J. BRENNER
Attesting Officer            Commissioner of Patents